US008808915B2

(12) United States Patent
Hur et al.

(10) Patent No.: US 8,808,915 B2
(45) Date of Patent: *Aug. 19, 2014

(54) RECHARGEABLE LITHIUM BATTERY

(75) Inventors: So-Hyun Hur, Suwon-si (KR);
Euy-Young Jung, Suwon-si (KR);
Duck-Chul Hwang, Suwon-si (KR);
Yong-Chul Park, Suwon-si (KR);
Jong-Hwa Lee, Suwon-si (KR);
Jeom-Soo Kim, Suwon-si (KR); Jae-Yul Ryu, Suwon-si (KR); Jin-Bum Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1803 days.

This patent is subject to a terminal disclaimer.

(21) Appl. No.: 11/889,307

(22) Filed: Aug. 10, 2007

(65) Prior Publication Data

US 2008/0118835 A1    May 22, 2008

(30) Foreign Application Priority Data

Nov. 20, 2006 (KR) ........................ 10-2006-0114543

(51) Int. Cl.

| H01M 4/13 | (2010.01) |
|---|---|
| H01M 10/052 | (2010.01) |
| H01M 4/36 | (2006.01) |
| H01M 4/131 | (2010.01) |
| H01M 4/505 | (2010.01) |
| H01M 10/0525 | (2010.01) |
| H01M 10/0568 | (2010.01) |
| H01M 4/525 | (2010.01) |
| H01M 4/134 | (2010.01) |
| H01M 4/133 | (2010.01) |

(52) U.S. Cl.
CPC .............. *H01M 4/525* (2013.01); *H01M 4/134* (2013.01); *H01M 10/052* (2013.01); *H01M 4/133* (2013.01); *H01M 4/364* (2013.01); *H01M 4/131* (2013.01); *H01M 4/505* (2013.01); *Y02E 60/122* (2013.01); *H01M 10/0525* (2013.01); *H01M 10/0568* (2013.01); *H01M 4/366* (2013.01)
USPC ................... 429/231.1; 429/231.3; 429/231.6; 429/231.5; 429/209; 429/223; 429/224; 429/231.8; 429/231.4; 429/341; 429/342; 429/343; 427/58; 427/126.3; 427/126.4; 427/126.6; 252/182.1

(58) Field of Classification Search
CPC ....... H01M 4/131; H01M 4/133; H01M 4/36; H01M 4/366; H01M 4/505; H01M 4/525; H01M 4/583; H01M 4/587; H01M 10/0525; H01M 10/0568; H01M 10/569; H01M 2004/027; H01M 2004/028; H01M 2300/0028; H01M 2300/0037

USPC ............ 429/231.1, 231.3, 231.6, 231.5, 209, 429/223, 224, 231.8, 231.4, 341, 342, 343; 427/58, 126.3, 126.4, 126.6; 252/182.1
See application file for complete search history.

(56) References Cited

U.S. PATENT DOCUMENTS

| 7,135,251 | B2 | 11/2006 | Cho et al. |
|---|---|---|---|
| 7,157,186 | B2 | 1/2007 | Nagayama et al. |
| 7,326,498 | B2 | 2/2008 | Park et al. |
| 7,335,446 | B2 | 2/2008 | Chiga et al. |
| 7,378,190 | B2 | 5/2008 | Yanai et al. |
| 7,473,493 | B2 | 1/2009 | Cho et al. |
| 7,622,222 | B2 * | 11/2009 | Chiga et al. ................. 429/231.1 |
| 7,682,740 | B2 | 3/2010 | Yong et al. |
| 2003/0211391 | A1 | 11/2003 | Cho et al. |
| 2005/0118511 | A1 | 6/2005 | Park et al. |
| 2005/0196674 | A1 | 9/2005 | Chiga et al. |
| 2005/0266150 | A1 | 12/2005 | Yong et al. |
| 2006/0024584 | A1 | 2/2006 | Kim et al. |
| 2007/0231705 | A1 | 10/2007 | Ohzuku et al. |
| 2007/0292764 | A1 | 12/2007 | Soma et al. |
| 2008/0118847 | A1 * | 5/2008 | Jung et al. ...................... 429/342 |
| 2008/0206650 | A1 * | 8/2008 | Kim et al. ...................... 429/326 |
| 2008/0248396 | A1 * | 10/2008 | Jung et al. ...................... 429/223 |
| 2010/0173197 | A1 | 7/2010 | Li et al. |

FOREIGN PATENT DOCUMENTS

| CN | 1458704 A | 11/2003 |
|---|---|---|
| JP | 06-168722 | 6/1994 |

(Continued)

OTHER PUBLICATIONS

Chinese Office Action for Application No. CN 200710148389.4; Applicant: Samsung SDI Co., Ltd., 5 pgs; dated Jan. 29, 2010, which was cited in the Information Disclosure Statement filed on Mar. 3, 2010 of the related U.S. Appl. No. 11/840,162.

(Continued)

*Primary Examiner* — Laura Weiner
(74) *Attorney, Agent, or Firm* — Robert E. Bushnell, Esq.

(57) ABSTRACT

The rechargeable lithium battery includes a positive electrode which includes a positive active material, a negative electrode, and an electrolyte which includes a non-aqueous organic solvent and a lithium salt. The positive active material includes a core including at least one of a compound represented by Formula 1 and a compound represented by Formula 2, and a surface-treatment layer which is formed on the core and includes a compound represented by Formula 3. The lithium salt includes $LiPF_6$ and a lithium imide-based compound.

$$Li_a Ni_b Co_c Mn_d M_e O_2 \quad (1)$$

$$Li_h Mn_2 M_i O_4 \quad (2)$$

$$M'_x P_y O_z \quad (3)$$

wherein each of M and M' is independently selected from the group consisting of an alkali metal, an alkaline-earth metal, a Group 13 element, a Group 14 element, a transition element, a rare earth element, and combinations thereof, $0.95 \leq a \leq 1.1$, $0 \leq b \leq 0.999$, $0 \leq c \leq 0.999$, $0 \leq d \leq 0.999$, $0.001 \leq e \leq 0.2$, $0.95 \leq h \leq 1.1$, $0.001 \leq i \leq 0.2$, $1 \leq y \leq 4$, $0 \leq y \leq 7$, and $2 \leq z \leq 30$.

17 Claims, 1 Drawing Sheet

(56) References Cited

FOREIGN PATENT DOCUMENTS

| | | |
|---|---|---|
| JP | 11-016569 | 1/1999 |
| JP | 2002-216753 | 8/2002 |
| JP | 2003-272704 | 9/2003 |
| JP | 2003-331846 | 11/2003 |
| JP | 2004-220785 | 8/2004 |
| JP | 2005-243301 | 9/2005 |
| JP | 2005-268017 | 9/2005 |
| JP | 2006-169048 | 6/2006 |
| JP | 2007-234350 | 9/2007 |
| JP | 2007-335331 | 12/2007 |
| KR | 10-2000-0073252 | 12/2000 |
| KR | 10-2001-0104150 | 11/2001 |
| KR | 10-2002-0007618 | 1/2002 |
| KR | 10-2002-0029813 | 4/2002 |
| KR | 10-2006-0041649 | 5/2006 |
| WO | 2006/123572 A1 | 11/2006 |

OTHER PUBLICATIONS

Tukamoto, H. et al., Electronic Conductivity of $LiCoO_2$ and its Enhancement by Magnesium Doping; Solid-State Science and Tecnology, J. Electrochem. So., vol. 144, No. 9, Sep. 1997 pp. 3164-3168, The Electrochemical Society, Inc. which was cited in the Information Disclosure Statement filed on Mar. 3, 2010 of the related U.S. Appl. No. 11/840,162.

The Search Report issued on Aug. 7, 2008 in corresponding European patent application No. 07115437 in 5 pages, which was cited in the Information Disclosure Statement filed on Oct. 15, 2008 of the related Application No. 11/840,162.

Office action (Paper No. 20100524) mailed on Jun. 1, 2010 of the related U.S. Appl. No. 11/751,958.

Office action (Paper No. 20101115) mailed on Nov. 19, 2010 of the related U.S. Appl. No. 11/808,732.

Office action (Paper No. 20101116) mailed on Nov. 22, 2010 of the related U.S. Appl. No. 11/840,162.

Office action (Paper No. 20081208) mailed on Dec. 17, 2008 of the related U.S. Appl. No. 11/840,162.

The Japanese Office Action corresponding to Japanese Application No. 2007-196179 dated Dec. 15, 2010, which was Cited in the Information Disclosure Statement filed on Jan. 14, 2011 of the related U.S. Appl. No. 11/840,162.

The Chinese Office Action corresponding to Chinese Application No. 2007101483894 dated Apr. 24, 2009, citing one (1) above-reference (CN1458704A) of the related U.S. Appl. No. 11/840,162.

* cited by examiner

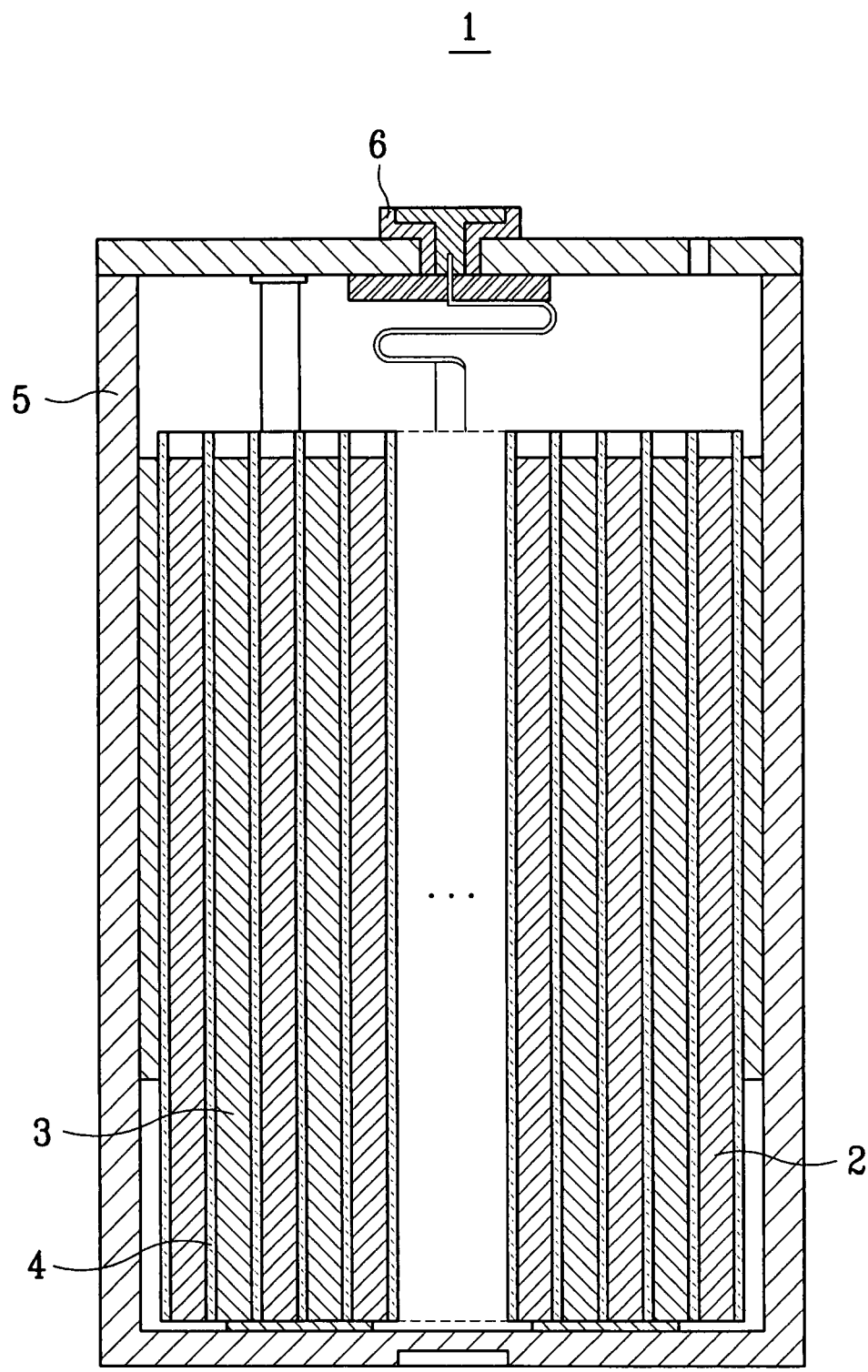

RECHARGEABLE LITHIUM BATTERY

CROSS-REFERENCE TO RELATED APPLICATION AND CLAIM OF PRIORITY

This application claims priority to and the benefit of Korean Patent Application No. 10-2006-0114543 filed in the Korean Intellectual Property Office on Nov. 20, 2006, the entire content of which is incorporated herein by reference.

BACKGROUND OF THE INVENTION (a) Field of the Invention

The present invention relates to a rechargeable lithium battery, and more particularly to a rechargeable lithium battery having high capacity and excellent cycle-life characteristics and stability.

(b) Description of the Related Art

A lithium rechargeable battery has recently drawn attention as a power source of small portable electronic devices. It uses an organic electrolyte solution and thereby has twice as high a discharge voltage as a conventional battery using an alkali aqueous solution, and accordingly has high energy density. For positive active materials of a rechargeable lithium battery, lithium-transition element composite oxides being capable of intercalating lithium ions, such as $LiCoO_2$, $LiMn_2O_4$, $LiNiO_2$, $LiNi_{1-x}Co_xO_2$ (0<x<1), $LiMnO_2$, and so on have been researched. As for a negative active material of a rechargeable lithium battery, various carbon-based materials such as artificial graphite, natural graphite, and hard carbon have been used, which can all intercalate and deintercalate lithium ions. Graphite of the carbon-based materials increases discharge voltages and energy density for a battery because it has a low discharge potential of −0.2V, compared to lithium. A battery using graphite as a negative active material has a high average discharge potential of 3.6V and an excellent energy density. Furthermore, graphite is most comprehensively used among the aforementioned carbon-based materials since graphite guarantees better cycle life for a battery due to its outstanding reversibility. However, a graphite active material has a low density and consequently a low capacity in terms of energy density per unit volume when using the graphite as a negative active material. Further, it involves some dangers such as explosion or combustion when a battery is misused or overcharged and the like, because graphite is likely to react with an organic electrolyte at a high discharge voltage. In order to solve those problems, a great deal of research on an oxide negative electrode has recently been performed. For example, amorphous tin oxide developed by Japan Fuji Film Co., Ltd. has a high capacity per weight (800 mAh/g). However, this oxide has resulted in some critical defects such as a high initial irreversible capacity of up to 50%. Furthermore, a part of the tin oxide has tended to be reduced into tin metal during the charge or discharge reaction, which exacerbates its acceptance for use in a battery. Referring to another oxide negative electrode, a negative active material of $Li_aMg_bVO_c$ (0.05≤a≤3, 0.12≤b≤2, 2≤2c-a-2b≤5) is disclosed in Japanese Patent Publication No. 2002-216753. The characteristics of a lithium secondary battery including $Li_{1.1}V_{0.9}O_2$ were also presented in the 2002 Japanese Battery Conference (Preview No. 3B05). However, such an oxide negative electrode does not show sufficient battery performance and therefore there has been a great deal of further research into oxide negative materials.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides an improved rechargeable lithium battery.

According to an embodiment of the present invention, provided is a rechargeable lithium battery including a positive electrode including a positive active material being capable of intercalating and deintercalating lithium ions, a negative electrode including a negative active material being capable of intercalating and deintercalating lithium ions, and an electrolyte including a non-aqueous organic solvent and a lithium salt.

The positive active material includes a core formed of a material including at least one of a compound represented by Formula 1 and a compound represented by Formula 2, and a surface-treatment layer which is formed on the core and includes a compound represented by the following Formula 3. The lithium salt includes $LiPF_6$ and a lithium imide-based compound.

$$Li_aNi_bCo_cMn_dM_eO_2 \qquad \text{Formula 1}$$

In the above Formula 1, M is selected from the group consisting of an alkali metal, an alkaline-earth metal, a Group 13 element, a Group 14 element, a transition element, a rare earth element, and combinations thereof, and 0.95≤a≤1.1, 0≤b≤0.999, 0≤c≤0.999, 0≤d≤0.999, and 0.001≤e≤0.2.

$$Li_hMn_2M_iO_4 \qquad \text{Formula 2}$$

In the above Formula 2, M is selected from the group consisting of an alkali metal, an alkaline-earth metal, a Group 13 element, a Group 14 element, a transition element, a rare earth element, and combinations thereof, and 0.95≤h≤1.1 and 0.001≤i≤0.2.

$$M'_xP_yO_z \qquad \text{Formula 3}$$

In the above Formula 3, M' is selected from the group consisting of an alkali metal, an alkaline-earth metal, a Group 13 element, a Group 14 element, a transition element, a rare earth element, and combinations thereof, and 1≤x≤4, 0≤y≤7 and 2≤z≤30.

The material forming the core may have an average particle diameter ranging from 0.1 to 100 μm.

The compound of the above Formula 3 is included in an amount of more than or equal to 0.001 wt % and less than 20 wt % of the total weight of the positive active material.

The positive electrode may have an active mass density of more than or equal to 3.65 g/cc.

The lithium imide-based compound is represented by the following Formula 4:

$$LiN(C_pF_{2p+1}SO_2)_r(C_qF_{2q+1}SO_2)_s \qquad \text{Formula 4}$$

In the above Formula 4, 1≤p, 1≤q, 0<r≤3, and 0≤s≤3.

The lithium salt includes $LiPF_6$ and a lithium imide-based compound in a weight ratio of 99.9:0.1 to 50:50.

The lithium salt is used at a concentration of 0.1 to 2.0M.

The electrolyte may further include a lithium salt selected from the group consisting of $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiSO_3CF_3$, $LiCl$, $LiI$, $LiB(C_2O_4)_2$, and combinations thereof.

The electrolyte may further include 0.01 to 2 parts by weight of $LiBF_4$ based on 100 parts by weight of $LiPF_6$.

The rechargeable lithium battery shows a charge voltage ranging from 4.3 to 4.5V.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a schematic cross-sectional view of a rechargeable lithium battery according to one embodiment of the present invention.

DETAILED DESCRIPTION OF THE EMBODIMENTS

An exemplary embodiment of the present invention will hereinafter be described in detail with reference to the accompanying drawings.

When a lithium battery is charged at a temperature of more than 25° C., positive and negative electrodes are thermally instable so that an electrolyte salt, an organic solvent, and active materials of positive and negative electrodes may decompose and thereby cell cycle-life and safety may deteriorate.

In order to solve the above problems, a surface-treated positive active material and an optimal combinatorial lithium salt are used to provide a rechargeable lithium battery having excellent cycle-life characteristics and safety even when using a positive electrode with a high active mass density.

FIG. 1 is a schematic cross-sectional view of a rechargeable lithium battery according to one embodiment of the present invention.

The rechargeable lithium battery 1 is mainly constructed of a negative electrode 2, a positive electrode 3, a separator 4 interposed between the positive electrode 3 and the negative electrode 2, and an electrolyte in which the separator 4 is immersed, in addition to a cell case 5 and a sealing member 6 that seals the cell case 5.

The positive electrode 3 includes a current collector and the positive active material layer disposed on the current collector. The positive active material layer includes a positive active material including a core and a surface-treatment layer disposed on the surface of the core.

The core may be formed of a material (which is also referred to as "core material") including at least one of a compound represented by Formula 1 and a compound represented by Formula 2 that are electrochemically reduced or oxidized.

$$Li_aNi_bCo_cMn_dM_eO_2 \quad \text{Formula 1}$$

In the above Formula 1, M is selected from the group consisting of an alkali metal, an alkaline-earth metal, a Group 13 element, a Group 14 element, a transition element, a rare earth element, and combinations thereof, and $0.95 \leq a \leq 1.1$, $0 \leq b \leq 0.999$, $0 \leq c \leq 0.999$, $0 \leq d \leq 0.999$, and $0.001 \leq e \leq 0.2$.

$$Li_hMn_2M_iO_4 \quad \text{Formula 2}$$

In the above Formula 2, M is selected from the group consisting of an alkali metal, an alkaline-earth metal, a Group 13 element, a Group 14 element, a transition element, a rare earth element, and combinations thereof, and $0.95 \leq h \leq 1.1$ and $0.001 \leq i \leq 0.2$.

The Groups 13 and 14 respectively refer to Al-containing group and Si-containing group according to the new IUPAC system in the periodic table.

The compounds of the above Formulas 1 and 2 lithium oxide doped with an element M.

The element M may be selected from the group consisting of Mg, Ca, Sr, Ba, Ra Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Si, Ge, Sn, P, As, Sb, Bi, S, Se, Te, Po, and combinations thereof. According to one embodiment, the element M may be selected from the group consisting of Mg, Ti, Al, and combinations thereof.

In the Formulae 1 and 2, a, b, c, d, e, h, and i denote mol % of each element in the compound, respectively. When the amounts of Li, Ni, Co, Mn, and M existing in the compound included in the core material is out of these ranges, the electrochemical characteristics and thermal stability in terms of high efficiency are not improved.

According to an embodiment, in the compound of Formula 1, the amount of Li may range from 0.96 to 1.05 mol %, and the amount of M may range from 0.005 to 0.1 mol %.

In the compound of Formula 2, the amount of Li may range from 0.97 to 1.05 mol %, and the amount of M may range from 0.005 to 0.1 mol %.

A core material including the compound represented by one of Formulas 1 and 2 may have an average particle diameter of 0.1 to 100 μm, and more specifically from 1 to 50 μm. When the average diameter of the core material is less than 0.1 μm, the active mass density is decreased, which is not desirable. When the average diameter of the core material exceeds 100 μm, the capacity deteriorates, which is also not desirable.

A surface treatment layer including the compound of the following Formula 3 is present on the surface of the core material.

$$M'_xP_yO_z \quad \text{Formula 3}$$

In the above Formula 3, M' is selected from the group consisting of an alkali metal, an alkaline-earth metal, a Group 13 element, a Group 14 element, a transition element, a rare earth element, and combinations thereof, and $1 \leq x \leq 4$, $0 \leq y \leq 7$ and $2 \leq z \leq 30$.

The element M' may be selected from the group consisting of Mg, Ca, Sr, Ba, Ra Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Si, Ge, Sn, P, As, Sb, Bi, S, Se, Te, Po, and combinations thereof. According to one embodiment, the element M' may be selected from the group consisting of Mg, Al, and combinations thereof.

The surface-treatment layer includes a compound selected from the group consisting of $Mg_2P_2O_7$, $Al_2O_3$, $AlPO_4$, and combinations thereof.

The amount of the compound of the above Formula 3 is more than or equal to 0.001 wt % and less than 20 wt % based on the total weight of the positive active material. According to another embodiment, the amount of the compound of the above Formula 3 ranges from 0.005 wt % to 10 wt % based on the total weight of the positive active material. When the amount of the compound of the Formula 3 is less than 0.001 wt %, the coating effect hardly appears, which is not desirable. When the amount is more than 20 wt %, the capacity deteriorates, which is also not desirable.

The positive active material including the surface treatment layer has excellent structural stability, it maintains the same average voltage band at high efficiency and low efficiency, and has excellent cycle-life and capacity characteristics. Also, the excellent thermal stability prevents short-circuit or battery explosion even when the battery is exposed to heat and over-charged. In addition, the surface treatment layer prevents the positive active material from directly contacting the electrolyte solution so that a side reaction between the positive active material and the electrolyte solution may be prevented. As a result, it is possible to prevent deterioration in thermal stability and cycle-life of the rechargeable lithium battery, which is caused by the side reaction between the positive active material and the electrolyte solution that may occur at a high voltage of 4.2 to 4.5V.

The positive active material layer including the positive active material may further include a binder for improving adherence between the positive active material layer and a current collector, or a conductive agent for improving electrical conductivity.

The binder may be selected from the group consisting of polyvinylchloride, polyvinyldifluoride, an ethylene, an oxide-containing polymer, polyvinylalcohol, carboxylated polyvinylchloride, polyvinylidenefluoride, polyimide, polyurethane, an epoxy resin, nylon, carboxylmethyl cellulose, hydroxypropylene cellulose, diacetylene cellulose, polyvinyl pyrrolidone, polytetrafluoroethylene, a styrene-butadiene rubber, acrylated styrene-butadiene rubber, copolymers thereof, and combinations thereof.

Any electrically conductive material can be used as a conductive agent unless it causes a chemical change. Examples of the conductive agent include natural graphite, artificial graphite, carbon black, acetylene black, ketjen black, carbon fiber, a metal powder, or a metal fiber including copper, nickel, aluminum, silver, and so on, or a polyphenylene derivative thereof.

The positive electrode according to an embodiment of the present invention can be fabricated as follows. A positive active material composition is prepared by mixing a positive active material, a binder, and optionally a conductive agent, and then the composition is applied on a positive current collector followed by drying and compression. The positive electrode manufacturing method is well known, and thus it is not described in detail in the present specification.

The positive active material, the binder, and the conductive agent are the same as above-described. The solvent used can be N-methylpyrrolidone, but it is not limited thereto.

The current collector may be selected from the group consisting of aluminum foil, nickel foil, stainless steel foil, titanium foil, nickel foam, aluminum foam, a polymer substrate coated with a conductive metal, and combinations thereof. According to one embodiment, aluminum foil may be appropriate.

The positive active material composition may be applied on the positive current collector by screen printing, spray coating, a coating method with a doctor blade, gravure coating, dip coating, silk screening, painting, or slot die coating, depending on the viscosity of the composition, but it is not limited thereto. According to one embodiment, screen printing may be suitably used.

Also, the active mass density of the positive electrode 2 may be adjusted in the fabrication of the positive electrode 2 by controlling the pressure, frequency number, and temperature during compression.

The compressing pressure, the compressing frequency number, and the compressing temperature are not specifically limited. However, they may be adjusted such that the fabricated positive electrode may have an active mass density of over 3.65 g/cc, and more specifically from 3.7 to 4.2 g/cc.

The active mass density of an electrode is a value obtained by dividing the mass of the components (e.g., active material, conductive agent, and binder) excluding the current collector in the electrode by the volume. The unit of active mass density is g/cc. Generally, the higher the active mass density of an electrode becomes, the better the battery capacity becomes. However, there is problem in that as the cycle-life characteristic deteriorates, the active mass density increases. For this reason, the active mass density of a positive electrode used in a generally-used rechargeable lithium battery is about 3.6 g/cc. However, the positive electrode of the rechargeable lithium battery suggested in the embodiment of the present invention has a high active mass density and excellent capacity characteristics and cycle-life characteristics.

The negative electrode 3 includes a current collector and a negative active material layer disposed on the current collector. The negative active material layer includes electrochemical redox materials such as a negative active material than can reversibly intercalate and deintercalate lithium ions.

The negative active material may include at least one selected from the group consisting of lithium, a metal being capable of alloying with lithium, a carbonaceous material, a composite material including the metal and carbonaceous material, and combinations thereof.

The metal being capable of alloying with lithium may be Al, Si, Sn, Pb, Zn, Bi, In, Mg, Ga, Cd, Ag, Ge, or Ti.

The carbonaceous material may include artificial graphite, natural graphite, graphitized carbon fiber, graphitized mesocarbon microbeads, fullerene, amorphous carbon, and so on. The amorphous carbon may be a soft carbon (carbon obtained by firing at a low temperature) or a hard carbon (carbon obtained by firing at a high temperature), and the crystalline carbon may be sheet-shaped, spherically-shaped, or fiber-shaped natural graphite or artificial graphite.

The carbonaceous material has an Lc (crystallite size) of at least 20 nm found through X-ray diffraction. According to one embodiment, the carbonaceous material has an Lc (crystallite size) of 50 to 1000 nm found through X-ray diffraction.

According to one embodiment, the crystalline carbonaceous material may be more suitable than the amorphous carbonaceous material. The carbonaceous material exhibits an exothermic peak at 700° C. or more.

The carbonaceous material may be a carbon material prepared by carbonizing mesophase spherical particles and graphitizing the carbonized material, or a graphite fiber prepared by carbonizing and graphitizing a mesophase pitch fiber.

The active material layer of the negative electrode 3 may further include a binder for improving adherence between the negative active material layer and a current collector, or a conductive agent for improving electrical conductivity as in the positive electrode 2.

The binder and the conductive agent may be the same as described above.

The negative electrode 3 can be fabricated as follows. A negative active material composition is prepared by mixing a negative active material, a binder, and optionally a conductive agent, and then the composition is applied on a negative current collector such as copper. The negative electrode manufacturing method is well known, and thus it is not described in detail in the present specification.

The solvent used can be N-methylpyrrolidone, but it is not limited thereto.

The current collector may be copper foil, nickel foil, stainless steel foil, titanium foil, nickel foam, copper foam, a polymer substrate coated with a conductive metal, or combinations thereof. According to one embodiment, copper foil may be appropriate.

In the rechargeable battery according to one embodiment of the present invention, the electrolyte includes a non-aqueous organic solvent and a lithium salt.

The lithium salts act as a lithium ion source, which facilitates the basic battery operation. According to one embodiment of the present invention, the lithium salt includes lithium hexafluorophosphate (LiPF$_6$) and a lithium imide-based compound.

The lithium imide-based compound is represented by the following Formula 4.

$$\text{LiN}(C_pF_{2p+1}SO_2)_r(C_qF_{2q+1}SO_2)_s \quad \text{Formula 4}$$

In the above Formula 4, $1 \leq p$, $1 \leq q$, $0 \leq r \leq 3$, and $0 \leq s \leq 3$.

The lithium imide-based compound may be selected from the group consisting of LiN(CF$_3$SO$_2$)$_2$, LiN(C$_2$F$_5$SO$_2$)$_2$, and a mixture thereof.

The LiPF$_6$ and lithium imide-based compounds have previously been individually used as lithium ion sources in electrolytes of a rechargeable lithium battery. However, the rechargeable lithium battery suggested in the embodiment of the present invention uses a lithium salt that combines the above two components so that the deterioration of the cycle-life characteristic caused by using a positive electrode of a high active mass density can be prevented.

LiPF$_6$ and a lithium imide-based compound are used in a weight ratio of 99.9:0.1 to 50:50. According to another embodiment, LiPF$_6$ and a lithium imide-based compound are used in a weight ratio of 96.7:3.3 to 56.7:43.3. When the amount of the lithium imide-based compound exceeds 50 wt % with respect to the LiPF$_6$ in the total weight of lithium salt, the capacity is reduced, which is not desirable. When the amount of LiPF$_6$ with respect to the lithium imide-based compound exceeds the range, the performance at a high temperature is reduced, which is not desirable.

The lithium salt that includes the LiPF$_6$ and the lithium imide-based compound at the optimal combination ratio may be included in the electrolyte at a concentration of 0.1 to 2.0M, and more specifically at a concentration of 0.5 to 1.8M. When the concentration of the lithium salt is lower than 0.1M, the battery does not adequately perform, which is not desirable. When it exceeds 2.0M, the performance at a high temperature deteriorates, which is also not desirable.

According to one embodiment of the present invention, the electrolyte may further include a conventional lithium salt as a lithium ion source. Examples of the conventional lithium salt may include LiBF$_4$, LiSbF$_6$, LiAsF$_6$, LiClO$_4$, LiCF$_3$SO$_3$, LiC$_4$F$_9$SO$_3$, LiAlO$_4$, LiAlCl$_4$, LiSO$_3$CF$_3$, LiCl, LiI, LiB(C$_2$O$_4$)$_2$, or a mixture thereof.

The additional lithium salt may be added in an appropriate amount. According to an embodiment, the LiBF$_4$ may be included at 0.01 to 2 parts by weight with respect to 100 parts by weight of LiPF$_6$, and more specifically at 0.05 to 1 part by weight. When the amount of LiBF$_4$ with respect to LiPF$_6$ is less than 0.01 parts by weight, the battery performance may deteriorate, which is not desirable. When it exceeds 2 parts by weight, the cycle-life characteristic may deteriorate, which is also not desirable.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Examples of the ester-based solvent may include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on. Examples of the ketone-based solvent include cyclohexanone, and so on. Examples of the alcohol-based solvent include ethanol, isopropyl alcohol, and so on. Examples of the aprotic solvent include nitrites such as X—CN (wherein X is a C2 to C50 linear, branched, or cyclic hydrocarbon, a double bond, an aromatic ring, or an ether bond), amides such as dimethylformamide, and dioxolanes such as 1,3-dioxolane, sulfolane, and so on.

The non-aqueous organic solvent may be used singularly or in mixture composed of two or more solvents. When the organic solvent is used in a mixture, the mixture ratio can be controlled in accordance with desired battery performance.

The carbonate-based solvent may include a mixture of a cyclic carbonate and a linear carbonate. When the cyclic carbonate and the chain carbonate are mixed together in a volume ratio of 1:1 to 1:9, and the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent may be represented by the following Formula 5.

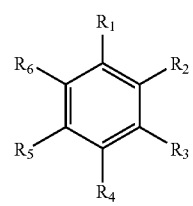

Formula 5

In the above Formula 5, R$_1$ to R$_6$ are independently selected from the group consisting of hydrogen, a halogen, a C1 to C10 alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include an additive to improve battery characteristics. According to one embodiment of the present invention, the electrolyte may further include an ethylene carbonate-based additive represented by the following Formula 6 to improve safety of a rechargeable lithium battery.

Formula 6

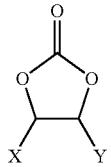

In the above Formula 6, X and Y are independently selected from the group consisting of hydrogen, a halogen, a cyano (CN), a nitro ($NO_2$), and a C1 to C5 fluorinated alkyl, and at least one of X and Y is selected from the group consisting of a halogen, a cyano (CN), a nitro ($NO_2$), and a C1 to C5 fluorinated alkyl.

According to one embodiment, the ethylene carbonate-based compound additive includes at least one selected from the group consisting of ethylene carbonate, fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof. According to another embodiment, fluoroethylene carbonate may be appropriate.

The amount of the ethylene carbonate-based compound additive may be controlled considering thermal stability of the electrolyte, but is not limited to a specific range.

The electrolyte having the above-composition can improve cycle-life characteristics at normal and high temperatures by including a mixture of $LiPF_6$ and a lithium imide-based compound as a lithium salt, even when using a positive electrode having a high active mass density.

The rechargeable lithium battery generally includes a positive electrode, a negative electrode, and an electrolyte. The battery may further include a separator as needed. The separator may include any material used in conventional lithium secondary batteries. Non-limiting examples of suitable separator materials include polyethylene, polypropylene, polyvinylidene fluoride, and multilayers thereof such as a polyethylene/polypropylene bilayered separator, a polyethylene/polypropylene/polyethylene three-layered separator, or a polypropylene/polyethylene/polypropylene three-layered separator.

The rechargeable lithium battery having the above constitution exhibits a charge voltage of more than or equal to 4.3V. According to one embodiment, the battery exhibits a charge voltage ranging from 4.3 to 4.5V. When the rechargeable lithium battery has a charge voltage of less than 4.3V, a high-capacity battery cannot be realized.

The rechargeable lithium batteries can be power sources for many types of electrical devices, for example portable telephones, cellular phones, game machines, portable televisions, laptop computers, calculators, etc. However, lithium batteries are not limited to these uses.

The following examples illustrate the present invention in more detail. These examples, however, should not in any sense be interpreted as limiting the scope of the present invention.

Battery Cell Performance Evaluation Depending on the Surface-Treated Positive Active Material and a Composition Ratio of a Lithium Salt

EXAMPLE 1-1

A mixture was prepared by mixing $CO_3O_4$, $Li_2CO_3$, and $Mg(OH)_2$ in water at a molar ratio of 1/3:1/2:1/50. The mixture was dried at 110° C. for 4 hours, and then underwent heat treatment again at 400° C. for 8 hours to prepare a core formed of $LiCo_{0.98}Mg_{0.02}O_2$ having an average particle diameter of 13 μm.

20 g of the $LiCo_{0.98}Mg_{0.02}O_2$ core material having an average particle diameter of 13 μm was added to 10 Ml of a 0.1 wt % $Mg_2P_2O_7$ solution, mixed, and dried at 130° C. for 30 minutes. The dried powder underwent heat treatment at 400° C. for 5 hours to prepare a positive active material including a surface treatment layer including a $Mg_2P_2O_7$ compound on the surface of $LiCo_{0.98}Mg_{0.02}O_2$.

The above prepared positive active material, polyvinylidene fluoride (PVDF) as a binder, and carbon (Super-P) as a conductive agent were dispersed and mixed in N-methyl-2-pyrrolidone at a weight ratio of 96:2:2 to prepare a composition for forming a positive active material layer.

The composition for forming a positive active material layer was applied to aluminum foil, dried, and compressed to prepare a positive electrode having an active mass density of 3.73 g/cc.

A composition for forming a negative active material layer was prepared by mixing carbon as a negative active material and PVDF as a binder at a weight ratio of 94:6, and dispersing the mixture in N-methyl-2-pyrrolidone. The composition was applied to copper foil, dried, and compressed to fabricate a negative electrode.

A polyethylene separator was interposed between the fabricated electrodes. They were spirally wound and compressed, and then an electrolyte was injected to fabricate a 18650 cylindrical battery. A mixed salt of 1.1M $LiPF_6$ and 0.4M $LiN(CF_3SO_2)_2$ dissolved in a mixture of a non-aqueous organic solvent of ethylene carbonate/ethylmethyl carbonate/dimethyl carbonate (EC/EMC/DMC) in a volume ratio of 3/3/4 was used for an electrolyte.

EXAMPLES 1-2 to 1-45 AND COMPARATIVE EXAMPLES 1 to 7

A rechargeable lithium battery was fabricated by the same method as in Example 1-1, except that the kinds of the doping element M and the surface treatment compound and the amounts of $LiPF_6$ and $LiN(CF_3SO_2)_2$ in the core material of the positive active material were diversely changed as shown in the following Tables 1a to 1c.

The rechargeable lithium battery cells fabricated according to Examples 1-1 to 1-45 and Comparative Examples 1 to 7 were charged at 0.2C and discharged at 0.2C once (formation process) and then charged at 0.5C and discharged at 0.2C once (standard process).

The cycle-life characteristics of the battery cells were estimated after the battery cells were charged at 1.0C and discharged at 1.0C 300 times at 60° C. Then their storage characteristics were estimated by standing the lithium rechargeable battery cells at 60° C. for two weeks and measuring their open circuit voltage (OCV). The results are presented in the following Tables 1a to 1c.

TABLE 1a

| | Doping Element, M (doping amount 2 mol %) | Core material | Surface treatment compound (0.1 wt %) | $LiPF_6$ (M) | $LiN(CF_3SO_2)_2$ (M) | Cycle life (%) | Storage characteristics (V) |
|---|---|---|---|---|---|---|---|
| Comp. Ex. 1 | — | $LiCoO_2$ | — | 1.5 | — | 35 | 4.06 |
| Comp. Ex. 2 | Mg | $LiCo_{0.98}Mg_{0.02}O_2$ | — | 1.5 | — | 41 | 4.07 |
| Comp. Ex. 3 | Mg | $LiCo_{0.98}Mg_{0.02}O_2$ | — | 1.0 | 0.5 | 65 | 4.10 |
| Comp. Ex. 4 | — | $LiCoO_2$ | $Mg_2P_2O_7$ | 1.5 | — | 52 | 4.08 |
| Comp. Ex. 5 | — | $LiCoO_2$ | $Mg_2P_2O_7$ | 1.0 | 0.5 | 62 | 4.09 |
| Comp. Ex. 6 | — | $LiCoO_2$ | — | 1.0 | 0.5 | 67 | 4.15 |
| Comp. Ex. 7 | Mg | $LiCo_{0.98}Mg_{0.02}O_2$ | $Mg_2P_2O_7$ | 1.5 | — | 71 | 4.13 |
| Ex. 1-1 | Mg | $LiCo_{0.98}Mg_{0.02}O_2$ | $Mg_2P_2O_7$ | 1.0 | 0.5 | 84 | 4.29 |
| Ex. 1-2 | Mg | $LiCo_{0.98}Mg_{0.02}O_2$ | $Mg_2P_2O_7$ | 1.1 | 0.4 | 82 | 4.27 |
| Ex. 1-3 | Mg | $LiCo_{0.98}Mg_{0.02}O_2$ | $Mg_2P_2O_7$ | 1.2 | 0.3 | 81 | 4.26 |
| Ex. 1-4 | Mg | $LiCo_{0.98}Mg_{0.02}O_2$ | $Mg_2P_2O_7$ | 1.3 | 0.2 | 80 | 4.24 |
| Ex. 1-5 | Mg | $LiCo_{0.98}Mg_{0.02}O_2$ | $Mg_2P_2O_7$ | 1.4 | 0.1 | 79 | 4.21 |
| Ex. 1-6 | Mg | $LiCo_{0.98}Mg_{0.02}O_2$ | $Al_2O_3$ | 1.0 | 0.5 | 83 | 4.34 |
| Ex. 1-7 | Mg | $LiCo_{0.98}Mg_{0.02}O_2$ | $Al_2O_3$ | 1.1 | 0.4 | 84 | 4.32 |
| Ex. 1-8 | Mg | $LiCo_{0.98}Mg_{0.02}O_2$ | $Al_2O_3$ | 1.2 | 0.3 | 81 | 4.31 |
| Ex. 1-9 | Mg | $LiCo_{0.98}Mg_{0.02}O_2$ | $Al_2O_3$ | 1.3 | 0.2 | 83 | 4.30 |
| Ex. 1-10 | Mg | $LiCo_{0.98}Mg_{0.02}O_2$ | $Al_2O_3$ | 1.4 | 0.1 | 80 | 4.26 |
| Ex. 1-11 | Mg | $LiCo_{0.98}Mg_{0.02}O_2$ | $AlPO_4$ | 1.0 | 0.5 | 82 | 4.28 |
| Ex. 1-12 | Mg | $LiCo_{0.98}Mg_{0.02}O_2$ | $AlPO_4$ | 1.1 | 0.4 | 81 | 4.26 |
| Ex. 1-13 | Mg | $LiCo_{0.98}Mg_{0.02}O_2$ | $AlPO_4$ | 1.2 | 0.3 | 81 | 4.25 |
| Ex. 1-14 | Mg | $LiCo_{0.98}Mg_{0.02}O_2$ | $AlPO_4$ | 1.3 | 0.2 | 79 | 4.23 |
| Ex. 1-15 | Mg | $LiCo_{0.98}Mg_{0.02}O_2$ | $AlPO_4$ | 1.4 | 0.1 | 77 | 4.20 |

TABLE 1b

| | Doping element, M (doping amount: 2 mol %) | Core material | Surface treatment compound (0.1 wt %) | $LiPF_6$ (M) | $LiN(CF_3SO_2)_2$ (M) | Cycle life (%) | Storage Characteristics (V) |
|---|---|---|---|---|---|---|---|
| Ex. 1-16 | Mg + Ti | $LiCo0.98Mg0.01Ti0.01O2$ | Mg2P2O7 | 1.0 | 0.5 | 81 | 4.26 |
| Ex. 1-17 | Mg + Ti | $LiCo0.98Mg0.01Ti0.01O2$ | Mg2P2O7 | 1.1 | 0.4 | 80 | 4.24 |
| Ex. 1-18 | Mg + Ti | $LiCo0.98Mg0.01Ti0.01O2$ | Mg2P2O7 | 1.2 | 0.3 | 79 | 4.23 |
| Ex. 1-19 | Mg + Ti | $LiCo0.98Mg0.01Ti0.01O2$ | Mg2P2O7 | 1.3 | 0.2 | 78 | 4.21 |
| Ex. 1-20 | Mg + Ti | $LiCo0.98Mg0.01Ti0.01O2$ | Mg2P2O7 | 1.4 | 0.1 | 77 | 4.18 |
| Ex. 1-21 | Mg + Ti | $LiCo0.98Mg0.01Ti0.01O2$ | Al2O3 | 1.0 | 0.5 | 84 | 4.28 |
| Ex. 1-22 | Mg + Ti | $LiCo0.98Mg0.01Ti0.01O2$ | Al2O3 | 1.1 | 0.4 | 82 | 4.26 |
| Ex. 1-23 | Mg + Ti | $LiCo0.98Mg0.01Ti0.01O2$ | Al2O3 | 1.2 | 0.3 | 81 | 4.25 |
| Ex. 1-24 | Mg + Ti | $LiCo0.98Mg0.01Ti0.01O2$ | Al2O3 | 1.3 | 0.2 | 80 | 4.23 |
| Ex. 1-25 | Mg + Ti | $LiCo0.98Mg0.01Ti0.01O2$ | Al2O3 | 1.4 | 0.1 | 78 | 4.20 |
| Ex. 1-26 | Mg + Ti | $LiCo0.98Mg0.01Ti0.01O2$ | AlPO4 | 1.0 | 0.5 | 80 | 4.25 |
| Ex. 1-27 | Mg + Ti | $LiCo0.98Mg0.01Ti0.01O2$ | AlPO4 | 1.1 | 0.4 | 79 | 4.23 |
| Ex. 1-28 | Mg + Ti | $LiCo0.98Mg0.01Ti0.01O2$ | AlPO4 | 1.2 | 0.3 | 78 | 4.22 |
| Ex. 1-29 | Mg + Ti | $LiCo0.98Mg0.01Ti0.01O2$ | AlPO4 | 1.3 | 0.2 | 77 | 4.20 |
| Ex. 1-30 | Mg + Ti | $LiCo0.98Mg0.01Ti0.01O2$ | AlPO4 | 1.4 | 0.1 | 75 | 4.17 |

TABLE 1c

| | Doping Element, M (2 mol %) | Core material | Surface Treatment compound (0.1 wt %) | $LiPF_6$ (M) | $LiN(CF_3SO_2)_2$ (M) | Cycle life (%) | Storage characteristics (V) |
|---|---|---|---|---|---|---|---|
| Ex. 1-31 | Mg + Al | $LiCo_{0.98}Mg_{0.01}Al_{0.01}O_2$ | $Mg_2P_2O_7$ | 1.0 | 0.5 | 82 | 4.28 |
| Ex. 1-32 | Mg + Al | $LiCo_{0.98}Mg_{0.01}Al_{0.01}O_2$ | $Mg_2P_2O_7$ | 1.1 | 0.4 | 81 | 4.26 |

TABLE 1c-continued

| | Doping Element, M (2 mol %) | Core material | Surface Treatment compound (0.1 wt %) | LiPF$_6$ (M) | LiN(CF$_3$SO$_2$)$_2$ (M) | Cycle life (%) | Storage characteristics (V) |
|---|---|---|---|---|---|---|---|
| Ex. 1-33 | Mg + Al | LiCo$_{0.98}$Mg$_{0.01}$Al$_{0.01}$O$_2$ | Mg$_2$P$_2$O$_7$ | 1.2 | 0.3 | 80 | 4.25 |
| Ex. 1-34 | Mg + Al | LiCo$_{0.98}$Mg$_{0.01}$Al$_{0.01}$O$_2$ | Mg$_2$P$_2$O$_7$ | 1.3 | 0.2 | 80 | 4.23 |
| Ex. 1-35 | Mg + Al | LiCo$_{0.98}$Mg$_{0.01}$Al$_{0.01}$O$_2$ | Mg$_2$P$_2$O$_7$ | 1.4 | 0.1 | 77 | 4.20 |
| Ex. 1-36 | Mg + Al | LiCo$_{0.98}$Mg$_{0.01}$Al$_{0.01}$O$_2$ | Al$_2$O$_3$ | 1.0 | 0.5 | 79 | 4.30 |
| Ex. 1-37 | Mg + Al | LiCo$_{0.98}$Mg$_{0.01}$Al$_{0.01}$O$_2$ | Al$_2$O$_3$ | 1.1 | 0.4 | 78 | 4.28 |
| Ex. 1-38 | Mg + Al | LiCo$_{0.98}$Mg$_{0.01}$Al$_{0.01}$O$_2$ | Al$_2$O$_3$ | 1.2 | 0.3 | 77 | 4.27 |
| Ex. 1-39 | Mg + Al | LiCo$_{0.98}$Mg$_{0.01}$Al$_{0.01}$O$_2$ | Al$_2$O$_3$ | 1.3 | 0.2 | 76 | 4.25 |
| Ex. 1-40 | Mg + Al | LiCo$_{0.98}$Mg$_{0.01}$Al$_{0.01}$O$_2$ | Al$_2$O$_3$ | 1.4 | 0.1 | 74 | 4.22 |
| Ex. 1-41 | Mg + Al | LiCo$_{0.98}$Mg$_{0.01}$Al$_{0.01}$O$_2$ | AlPO$_4$ | 1.0 | 0.5 | 76 | 4.27 |
| Ex. 1-42 | Mg + Al | LiCo$_{0.98}$Mg$_{0.01}$Al$_{0.01}$O$_2$ | AlPO$_4$ | 1.1 | 0.4 | 75 | 4.25 |
| Ex. 1-43 | Mg + Al | LiCo$_{0.98}$Mg$_{0.01}$Al$_{0.01}$O$_2$ | AlPO$_4$ | 1.2 | 0.3 | 73 | 4.24 |
| Ex. 1-44 | Mg + Al | LiCo$_{0.98}$Mg$_{0.01}$Al$_{0.01}$O$_2$ | AlPO$_4$ | 1.3 | 0.2 | 72 | 4.22 |
| Ex. 1-45 | Mg + Al | LiCo$_{0.98}$Mg$_{0.01}$Al$_{0.01}$O$_2$ | AlPO$_4$ | 1.4 | 0.1 | 71 | 4.19 |

According to the above Tables 1a to 1c, the lithium rechargeable battery cells of Examples 1-1 to 1-45 that use the positive active material having the surface treatment layer and the electrolyte including both LiPF$_6$ salt and the lithium imide compound showed excellent cycle-life characteristics and storage characteristics at a high temperature, compared to the rechargeable lithium battery cells of Comparative Example 1-7 whose battery formation conditions and amount conditions are out of the range suggested in the embodiments of the present invention.

Battery Cell Performance Evaluation Depending on Composition Ratio of a Lithium Salt

EXAMPLE 2-1

A mixture was prepared by mixing CO$_3$O$_4$, Li$_2$CO$_3$, and Mg(OH)$_2$ in water at a molar ratio of 1/3:1/2:1/50. The mixture was dried at 110° C. for 4 hours and then underwent heat treatment again at 400° C. for 8 hours to prepare a core formed of LiCo$_{0.98}$Mg$_{0.02}$O$_2$ having an average particle diameter of 13 μm.

20 g of the LiCo$_{0.98}$Mg$_{0.02}$O$_2$ core material having an average particle diameter of 13 μm was added to 10 Ml of a 0.1 wt % Mg$_2$P$_2$O$_7$ solution, mixed, and dried at 130° C. for 30 minutes. The dried powder underwent heat treatment at 400° C. for 5 hours to prepare a positive active material including a surface treatment layer containing the Mg$_2$P$_2$O$_7$ compound on the surface of LiCo$_{0.98}$Mg$_{0.02}$O$_2$.

A composition for forming a positive active material layer was prepared by dispersing and mixing the above prepared positive active material, polyvinylidene fluoride (PVDF) as a binder, and carbon (Super-P) as a conductive agent in N-methyl-2-pyrrolidone in a weight ratio of 96:2:2.

The composition for forming a positive active material layer was applied to aluminum foil, dried, and compressed to fabricate a positive electrode having an active mass density of 3.73 g/cc.

A composition for forming a negative active material layer was prepared by mixing carbon as a negative active material and PVDF as a binder at a weight ratio of 94:6, and dispersing the mixture in N-methyl-2-pyrrolidone. The composition was applied to copper foil, dried, and compressed to prepare a negative electrode.

A polyethylene separator was interposed between the fabricated electrodes, spirally wound, compressed, and then an electrolyte was injected to fabricate a 18650 cylindrical battery. A mixed salt of 1.3M LiPF$_6$ and 0.5M LiN(CF$_3$SO$_2$)$_2$ dissolved in a mixture of a non-aqueous organic solvent of ethylene carbonate/ethylmethyl carbonate/dimethyl carbonate (EC/EMC/DMC) in a volume ratio of 3/3/4 was used for an electrolyte.

EXAMPLES 2-2 to 2-17

A rechargeable lithium battery cell was fabricated in the same method as in Example 2-1, except that the amount of LiN(CF$_3$SO$_2$)$_2$ to be added was diversely changed as shown in the following Table 2.

The cell characteristics of the rechargeable lithium battery cells fabricated according to Example 2-1 to 2-17 were measured in the same method as the previously performed "Battery cell performance evaluation depending on the surface-treated positive active material and a composition ratio of a lithium salt."

The results are shown in the following Table 2.

TABLE 2

| | LiPF$_6$:LiN(CF$_3$SO$_2$)$_2$ composition ratio (weight ratio) | Cycle life (%) | Storage Characteristics (V) |
|---|---|---|---|
| Comp. Ex. 7 | 100:0 | 71 | 4.13 |
| Ex. 2-1 | 99.9:0.1 | 74 | 4.18 |
| Ex. 2-2 | 96.7:3.3 | 75 | 4.19 |

TABLE 2-continued

| | $LiPF_6:LiN(CF_3SO_2)_2$ composition ratio (weight ratio) | Cycle life (%) | Storage Characteristics (V) |
|---|---|---|---|
| Ex. 2-3 | 93.3:6.7 | 79 | 4.21 |
| Ex. 2-4 | 90.0:10.0 | 79 | 4.23 |
| Ex. 2-5 | 86.7:13.3 | 80 | 4.24 |
| Ex. 2-6 | 83.3:16.7 | 81 | 4.25 |
| Ex. 2-7 | 80.0:20.0 | 81 | 4.26 |
| Ex. 2-8 | 76.7:23.3 | 81 | 4.26 |
| Ex. 2-9 | 73.3:26.7 | 82 | 4.27 |
| Ex. 2-10 | 70.0:30.0 | 83 | 4.27 |
| Ex. 2-11 | 66.7:33.3 | 84 | 4.29 |
| Ex. 2-12 | 63.3:36.7 | 82 | 4.28 |
| Ex. 2-13 | 60.0:40.0 | 80 | 4.26 |
| Ex. 2-14 | 56.7:43.3 | 78 | 4.21 |
| Ex. 2-15 | 53.3:46.7 | 75 | 4.20 |
| Ex. 2-16 | 50.0:50.0 | 72 | 4.18 |
| Ex. 2-17 | 46.7:53.3 | 65 | 4.16 |

As shown in the Table 2, the rechargeable lithium battery cells of Examples 2-1 to 2-16 that included both $LiPF_6$ and $LiN(CF_3SO_2)_2$ showed better cycle-life and storage characteristics than the rechargeable lithium battery cell of Comparative Example 7 that included only $LiPF_6$. The rechargeable lithium battery cell of Example 2-17 showed a lower cycle-life characteristic but a better storage characteristic than the rechargeable lithium battery cell of Comparative Example 7.

Particularly, the rechargeable lithium battery cells of Examples 2-1 to 2-16 that included $LiPF_6$ and $LiN(CF_3SO_2)_2$ at a ratio of 99.9:0.1 to 50:50 showed better performance than the rechargeable lithium battery cell of Example 2-17. Thus, it was proven that the above ratio of $LiPF_6$ to $LiN(CF_3SO_2)_2$ is the optimal composition ratio.

Battery Cell Performance Evaluation Depending on a Loading Amount of Surface Treatment Compound

EXAMPLE 3-1

A mixture was prepared by mixing $CO_3O_4$, $Li_2CO_3$ and $Mg(OH)_2$ in water at a molar ratio of 1/3:1/2:1/50. The mixture was dried at 110° C. for 4 hours, and then underwent heat treatment again at 400° C. for 8 hours to prepare a core formed of $LiCo_{0.98}Mg_{0.02}O_2$ having an average particle diameter of 13 μm.

20 g of the $LiCo_{0.98}Mg_{0.02}O_2$ core material having an average particle diameter of 13 μm was added to 10 Ml of a 0.001 wt % $Mg_2P_2O_7$ solution, mixed, and dried at 130° C. for 30 minutes. The dried powder underwent heat treatment at 400° C. for 5 hours to prepare a positive active material including a surface treatment layer including a $Mg_2P_2O_7$ compound on the surface of $LiCo_{0.98}Mg_{0.02}O_2$.

The above-prepared positive active material, polyvinylidene fluoride (PVDF) as a binder, and carbon (Super-P) as a conductive agent were dispersed and mixed in N-methyl-2-pyrrolidone at a weight ratio of 96:2:2 to prepare a composition for forming a positive active material layer.

The composition for forming a positive active material layer was applied to aluminum foil, dried, and compressed to prepare a positive electrode having an active mass density of 3.73 g/cc.

A composition for forming a negative active material layer was prepared by mixing carbon as a negative active material and PVDF as a binder at a weight ratio of 94:6, and dispersing the mixture in N-methyl-2-pyrrolidone. The composition was applied to copper foil, dried, and compressed to prepare a negative electrode.

A polyethylene separator was interposed between the fabricated electrodes, spirally wound, compressed, and then an electrolyte was injected to fabricate a 18650 cylindrical battery. A mixed salt of 1.1M $LiPF_6$ and 0.4M $LiN(CF_3SO_2)_2$ dissolved in a mixture of a non-aqueous organic solvent of ethylene carbonate/ethylmethyl carbonate/dimethyl carbonate (EC/EMC/DMC) in a volume ratio of 3/3/4 was used for an electrolyte.

EXAMPLES 3-2 To 3-10

Rechargeable lithium battery cells were fabricated by the same method as in Example 3-1, except that the loading amount of the surface treatment compound on the core material of the positive active material was diversely changed and added.

The cell characteristics of the rechargeable lithium battery cells fabricated according to Examples 3-1 to 3-10 were measured in the same method as the previously performed "Battery cell performance evaluation depending on the surface-treated positive active material and a composition ratio of a lithium salt."

The results are shown in the following Table 3.

TABLE 3

| | Coating amount of $Mg_2P_2O_7$ (wt %) | Cycle life (%) | Storage characteristics (V) |
|---|---|---|---|
| Comp. Ex. 3 | 0 | 65 | 4.10 |
| Ex. 3-1 | 0.001 | 72 | 4.19 |
| Ex. 3-2 | 0.01 | 76 | 4.21 |
| Ex. 3-3 | 0.05 | 79 | 4.23 |
| Ex. 3-4 | 0.1 | 82 | 4.27 |
| Ex. 3-5 | 0.5 | 81 | 4.28 |
| Ex. 3-6 | 1 | 80 | 4.24 |
| Ex. 3-7 | 2 | 79 | 4.23 |
| Ex. 3-8 | 5 | 77 | 4.21 |
| Ex. 3-9 | 10 | 73 | 4.17 |
| Ex. 3-10 | 20 | 67 | 4.08 |

According to Table 3, the rechargeable lithium battery cells of Examples 3-1 to 3-9 that included a positive active material with a surface treatment layer showed much better cycle-life and storage characteristics than the rechargeable lithium battery cell of Comparative Example 3 that included a positive active material without a surface treatment layer.

The rechargeable lithium battery cell of Example 3-10 showed a lower storage characteristic but a better cycle-life characteristic than the rechargeable lithium battery cell of Comparative Example 3.

Particularly, the rechargeable lithium battery cells of Examples 3-1 to 3-9 where the loading amounts of the surface treatment compound in the surface treatment layer were 0.001 to 10 wt % with respect to the total weight of the active material showed much better characteristics than Example 3-10 and Comparative Example 3. Thus, it was proven that the range of the above loading amount is the optimal range for the surface treatment compound.

The rechargeable lithium battery fabricated according to the embodiment of the present invention has high-capacity and excellent cycle-life characteristic, and it particularly maintains the high-capacity and excellent cycle-life characteristic at a high voltage and in a high active mass density.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
a positive electrode comprising a positive active material being capable of intercalating and deintercalating lithium ions, the positive active material comprising:
a core formed of a material comprising a compound represented by Formula 1:

$$Li_aNi_bCo_cMn_dM_eO_2 \quad (1)$$

wherein M is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Si, Ge, Sn, P, As, Sb, Bi, S, Se, Te, Po, and combinations thereof,
$0.95 \leq a \leq 1.1$, $0 \leq b \leq 0.999$, $0 \leq c \leq 0.999$, $0 \leq d \leq 0.999$, and $0.001 \leq e \leq 0.2$; and
a surface-treatment layer formed on the core, the surface-treatment layer comprising a compound represented by Formula 3:

$$M'_xP_yO_z \quad (3)$$

wherein M' is independently selected from the group consisting of an alkali metal, an alkaline-earth metal, a Group 13 element, a Group 14 element, a transition element, a rare earth element, and combinations thereof, and $1 \leq x \leq 4$, $0 \leq y \leq 7$, and $2 \leq z \leq 30$;
a negative electrode comprising a negative active material being capable of intercalating and deintercalating lithium ions; and
an electrolyte comprising a non-aqueous organic solvent and a lithium salt, the lithium salt comprising $LiPF_6$ and $LiN(CF_3SO_2)_2$ are present in a weight ratio of 99.9:0.1 to 50:50.

2. The rechargeable lithium battery of claim 1, wherein the element M is selected from the group consisting of Mg, Ti, Al, and combinations thereof.

3. The rechargeable lithium battery of claim 1, wherein the element M' is selected from the group consisting of Mg, Ti, Al, and combinations thereof.

4. The rechargeable lithium battery of claim 1, wherein the material of the core has an average particle diameter of 0.1 to 100 μm.

5. The rechargeable lithium battery of claim 1, wherein the compound of Formula 3 comprises at least one selected from the group consisting of $Mg_2P_2O_7$, $Al_2O_3$, $AlPO_4$, and combinations thereof.

6. The rechargeable lithium battery of claim 1, wherein the amount of the compound of Formula 3 is more than or equal to 0.001 wt % and less than 20 wt % based on the total weight of the positive active material.

7. The rechargeable lithium battery of claim 1, wherein the positive electrode has an active mass density of 3.65 g/cc to 4.2 g/cc.

8. The rechargeable lithium battery of claim 1, wherein the lithium salt is included at a concentration of 0.1 to 2.0M.

9. The rechargeable lithium battery of claim 1, wherein the electrolyte further comprises an additional lithium salt selected from the group consisting of $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiSO_3CF_3$, LiCl, LiI, $LiB(C_2O_4)_2$, and combinations thereof.

10. The rechargeable lithium battery of claim 9, wherein the additional lithium salt comprises 0.01 to 2 parts by weight of $LiBF_4$ based on 100 parts by weight of $LiPF_6$.

11. The rechargeable lithium battery of claim 1, wherein the negative active material comprises at least one selected from the group consisting of lithium, a metal being capable of alloying with lithium, a carbonaceous material, a composite material including the metal and carbonaceous material, and combinations thereof.

12. The rechargeable lithium battery of claim 11, wherein the metal being capable of alloying with lithium is selected from the group consisting of Al, Si, Sn, Pb, Zn, Bi, In, Mg, Ga, Cd, Ag, Ge, Ti, and combinations thereof.

13. The rechargeable lithium battery of claim 11, wherein the carbonaceous material has an Lc (crystallite size) ranging from 20 nm to 1,000 nm found through X-ray diffraction.

14. The rechargeable lithium battery of claim 11, wherein the carbonaceous material is a carbon material or a graphite fiber.

15. The rechargeable lithium battery of claim 1, wherein the non-aqueous organic solvent comprises an organic solvent selected from the group consisting of a carbonate-based solvent, an ester-based solvent, an ether-based solvent, a ketone-based solvent, an alcohol-based solvent, an aprotic solvent, and combinations thereof.

16. The rechargeable lithium battery of claim 1, which has a charge voltage of 4.3 to 4.5V.

17. The rechargeable lithium battery of claim 1, wherein the compound represented by Formula 1 is $LiCu_{0.98}Mg_{0.02}O_2$ or $LiCo_{0.98}Mg_{0.01}Ti_{0.01}O_2$.

* * * * *